United States Patent Office 2,918,760
Patented Dec. 29, 1959

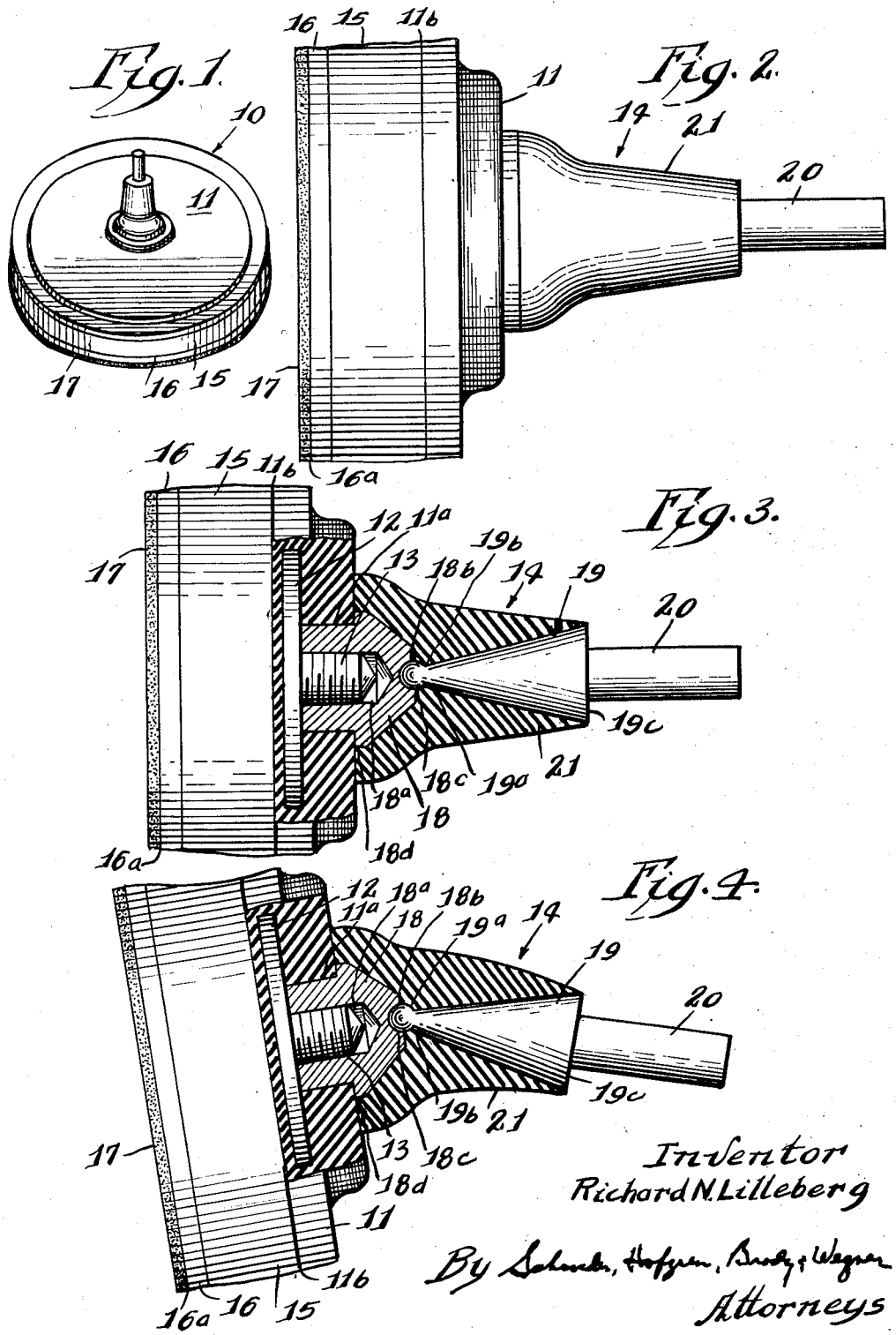

2,918,760

ABRADING DISK MOUNT

Richard N. Lilleberg, Chicago, Ill., assignor to The Flexan Corporation, a corporation of Illinois Application February 26, 1958, Serial No. 717,651

7 Claims. (Cl. 51—168)

This invention relates to a rubbing tool and more particularly to a rotatable sanding, grinding or polishing tool for use on plane surfaces which has a universal joint connection adapted to absorb radial distortions while transmitting rotational force and to the universal joint itself.

Rubbing tools such as polishers, sanders, grinders and the like, having flat working surfaces are difficult to operate satisfactorily when working on a plane surface. Unless the tools are held flush against the plane surface, that is, with the working face of the tool parallel to and in contact with the surface at all times, the tool tends to walk along the surface. Such movement, of course, leaves unsatisfactory and unsightly gouges, scratches and the like, and results in an over-all unsatisfactory job.

The tool of this invention overcomes this problem since the universal joint automatically causes the flat working surface to accommodate itself to the plane surface. Thus the operator may hold the tool at an angle to the work without causing it to walk or leaving any unsightly mark.

It is therefore, an object of this invention to provide a rubbing tool which is adapted for use on plane surfaces while avoiding this problem comprising, a rotatable portion having a substantially planar rubbing surface and means connected to this portion for applying a rotational force thereto, the means including a joint adapted to absorb radial distortion while transmitting rotational force.

It is another object of this invention to provide a universal joint comprising a pair of contacting driving and driven members encased in a bonded resilient sheath.

It is a still further object of this invention to provide a joint adapted to absorb radial distortion while transmitting rotational force comprising a driving member and a driven member with the members having concavoconvex abutting ends and a sheath of a thermoset elastomer bonded to the surface of the members.

Other objects and advantages of this invention will become apparent from the following dfescription taken together with the accompanying drawings. Of the drawings:

Fig. 1 is a perspective view of the rubbing tool of this invention;

Fig. 2 is a fragmentary side elevational view;

Fig. 3 is a fragmentary side elevational view partially broken away; and

Fig. 4 is a view similar to Fig. 3 with the joint radially distorted.

The rubbing tool 10 of this invention includes a disc-shaped member 11 which may be constructed of any fairly rigid resilient material such as rubber. A stud plate 12 is fitted into the interior of the member 11 and has a stud 13 extending upwardly therefrom into a recess 11a in the disc-shaped member. The stud 13 is threaded and is designed to engage a portion of the joint 14 which will be explained later.

The face 11b of the disc-shaped member is coated with a pressure sensitive adhesive. By pressure sensitive adhesive is meant an adhesive which under ordinary atmospheric conditions is tacky and non-drying and in a condition such that adhesion is secured by the application of slight pressure and without the necessity of activating the adhesive by solvents or otherwise treating it for firm adherence to or removal from surfaces. An example of such a permanently tacky adhesive is as follows:

| | Percent by weight |
|---|---|
| Rubber | 80 |
| Rosin | 16 |
| Zinc oxide | 4 |

A pad 15 of a resilient cellular material such as polyurethane or polyether is adhered to the surface 11b by means of the pressure sensitive adhesive. Another rubber disc 16 having a fibrous material imbedded therein is permanently attached as by thermosetting vulcanization to the pad 15. The face 16a of the disc is also coated with a pressure sensitive adhesive such as has been already described.

A rubbing sheet 17 is attached to the disc 16 by means of the adhesive. This sheet may be sandpaper or the like, either coarse or fine, may be a cloth or brush pad or, may be any other material which is desirable for use in sanding, grinding or polishing operations.

The joint 14 is provided for imparting a rotational movement to the tool 10. This joint includes a conically shaped driven member 18 which has a threaded aperture 18a for threadedly receiving the stud 13. Near the apex 18b of the cone is located a socket 18c. The conically shaped driving member 19 has a ball shaped end 19a located at the apex 19b of its cone. The end 19a is of a size and shape allowing it to seat in the socket 18c, thus providing a smoothly movable contact between the members 18 and 19. A shaft 20 extends outwardly from the driving member 19 and is designed to be attached to a rotational power source such as a conventional drill motor and the like (not shown).

A sheath 21 of resilient material surrounds the members 18 and 19 extending from the base 19c of the driving member to the base 18d of the cone of the driven member. The inner surface of the sheath 21 is bonded to the surfaces of the driven 18 and driving 19 members.

The resilient sheath 21 may be made of any of the thermosetting elastomers such as natural or synthetic rubber. For example, the following natural and synthetic rubber recipes have been found satisfactory for making the joint sheath 21:

| Components: | Parts by weight |
|---|---|
| Natural rubber | 100.0 |
| Zinc oxide | 5.0 |
| Stearic acid | 2.0 |
| Phenyl-beta-napthylamine | 1.0 |
| Easy process channel black | 45.0 |
| Process oil | 5.0 |
| Sulphur | 3.0 |
| Benzothiazole disulfide | 1.0 |
| Zinc dimethyl-dithiocarbamate | .1 |
| Neoprene W. | 54.0 |
| Antioxidant | 1.1 |
| Light magnesium oxide | 1.22 |
| Fine thermal black | 40.0 |
| Zinc oxide | 2.7 |
| Stearic acid | .27 |
| Sulphur | .54 |
| Thionex | .17 |

These rubber receipes are common and are representative of the many available receipes for thermosetting elastomers which are useful in making the joint of this invention.

As pointed out above it is necessary to bond the sheath 21 to the surfaces of the members 18 and 19. There are two general methods in use for bonding rubber and other elastomeric materials to metals. The first method is a brass plating process and the second method is the bonding agent process, sometimes called the organic method.

The brass plating process entails first, thoroughly cleaning the surface of the metal to be bonded and depositing thereon a coating of brass by a common electrolytic plating process. This brass plate should contain by weight between about 65 to 70% of copper and 35 to 30% of zinc. The rubber stock which has been compounded as by the recipes given above is then firmly pressed against the brass coating on the metal wall, usually by using a hydraulic press and then heated while under pressure at a temperature and for a length of time depending upon the thickness of the rubber part necessary for completing the bonding and vulcanization. For the purposes of this invention it has been found that temperatures ranging from about 280° to 330° F. are sufficient and that the vulcanizing normally takes from about 5 to 15 minutes. A preferred temperature is about 300° F.

The second method of bonding sometimes called the organic method uses organic bonding agents consisting of various gums and resins compounded with curing agents, reinforcing materials and usually having certain chemically active groups and polar properties. These bonded materials are commonly in use in industry today, and consist primarily of chlorinated natural and synthetic rubbers, phenolic resins, aromatic isocyanates, copolymers of natural and synthetic rubbers with methacrylic acid and cyclo rubbers. These bonding agents are usually marketed in the form of solutions in which the various ingredients have been dissolved or dispersed in volatile solvents so as to allow easy application by painting, dipping, spraying, or the like.

In bonding the sheath 21 to the members 18 and 19, using a bonding agent, the members are first degreased and then sandblasted with a fine sand to provide a smooth surface. The members are then coated with a bonding agent such as described and are then subjected to vulcanization in the same manner as described in regard to bonding using brass plating.

In operating the rubbing tool 10 of this invention, it is unnecessary to maintain the working surface of the sheet 17 carefully parallel to the plane surface of the material being ground, sanded or polished. Thus the operator need not worry about attempting to maintain right angular relationship between an imaginary axis of rotation of the tool and the plane surface of the work. Because of the joint 14, the operator need only apply the tool to the work since it will align itself for proper grinding, sanding or polishing.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. A rubbing tool adapted for use on plane surfaces, comprising: a rotatable portion having a substantially planar rubbing surface, and means connected to said portion for applying a rotational force thereto including a joint adapted to absorb radial distortion while transmitting rotational force; said joint having a driving member and a driven member, said members having concavo-convex abutting ends; and a sheath of a thermoset elastomer bonded to the surfaces of said members next adjacent said abutting ends.

2. A rubbing tool adapted for use on plane surfaces, comprising: a rotatable resilient disc having a substantially planar surface, a rubbing substance attached to said surface, and means connected to said disc adapted for connection to a rotational power source for applying a rotational force to said disc, said means including a joint adapted to absorb radial distortion while transmitting rotational force; said joint having a driving member adapted to be connected to said rotational power source and a driven member adapted to be connected to said disc, said members contacting each other in a ball and socket; and a sheath of a resilient thermoset elastomer intimately bonded to the surfaces of said members next adjacent said ball and socket.

3. A rubbing tool adapted for use on plane surfaces, comprising: a rotatable portion having a substantially planar rubbing surface, said surface having a coating of pressure sensitive adhesive, a rubbing sheet attached to said surface by said adhesive, and means connected to said disc and adapted for connection to a rotational power source for applying a rotational force to said disc, said means including a joint adapted to absorb radial distortion while transmitting rotational force; said joint having a conically shaped driving member adapted to be connected to said rotational power source and a conically shaped driven member adapted to be connected to said disc, said members contacting each other in a ball and socket, said ball and socket being located at the apices of the cones of said members; and a rubber sheath surrounding said members and extending longitudinally from the base of the cone of the driving member to the base of the cone of the driven member, said sheath being intimately bonded to the surfaces of said members next adjacent said ball and socket.

4. The tool of claim 3 wherein a layer of resilient cellular material is interposed between said sheet and said disc, said layer having a coating of pressure sensitive adhesive for holding said sheet.

5. A joint adapted to absorb radial distortion while transmitting rotational force, comprising: a driving member and a driven member, said members having concavo-convex abutting ends; and a sheath of a thermoset elastomer bonded to the surfaces of said members next adjacent said abutting ends.

6. A joint adapted to absorb radial distortion while transmitting rotational force, comprising: a driving member adapted to be connected to a rotational power source and a driven member adapted to be connected to a rotatable tool, said members contacting each other in a ball and socket; and a sheath of a resilient thermoset elastomer intimately bonded to the surfaces of said members next adjacent said ball and socket.

7. A joint adapted to absorb radial distortion while transmitting rotational force, comprising: a conically shaped driving member adapted to be connected to a rotational power source and a conically shaped driven member adapted to be connected to a rotatable tool, said members contacting each other in a ball and socket, said ball and socket being located at the apices of the cones of said members; and a rubber sheath surrounding said members and extending longitudinally from the base of the cone of the driving member to the base of the cone of the driven member, said sheath being intimately bonded to the surfaces of said members next adjacent said ball and socket.

References Cited in the file of this patent

UNITED STATES PATENTS

| | | |
|---|---|---|
| 2,295,282 | Mall | Sept. 8, 1942 |
| 2,417,737 | Culp | Mar. 18, 1947 |
| 2,486,078 | Tocci-Guilbert | Oct. 25, 1949 |
| 2,542,154 | Mesirow | Feb. 20, 1951 |
| 2,629,990 | Tocci-Guilbert | Mar. 3, 1953 |
| 2,633,008 | Tocci-Guilbert | Mar. 31, 1953 |
| 2,644,280 | O'Neil | July 7, 1953 |
| 2,767,527 | Tocci-Guilbert | Oct. 23, 1956 |
| 2,810,239 | Burleigh | Oct. 22, 1957 |